US011138910B1

(12) United States Patent
Polk et al.

(10) Patent No.: US 11,138,910 B1
(45) Date of Patent: Oct. 5, 2021

(54) REPOSITIONABLE DISPLAY PANEL

(71) Applicant: Shutterfly, LLC, Redwood City, CA (US)

(72) Inventors: Michael Lane Polk, Mint Hill, NC (US); Gregory Lee Franklin, Indian Trail, NC (US)

(73) Assignee: Shutterfly, LLC, Redwood City, CA (US)

( * ) Notice: Subject to any disclaimer, the term of this patent is extended or adjusted under 35 U.S.C. 154(b) by 0 days.

(21) Appl. No.: 17/095,167

(22) Filed: Nov. 11, 2020

Related U.S. Application Data

(63) Continuation-in-part of application No. 29/746,210, filed on Aug. 12, 2020.

(51) Int. Cl.
*G09F 7/18* (2006.01)
*C09J 7/38* (2018.01)
*B29C 65/48* (2006.01)

(52) U.S. Cl.
CPC .............. *G09F 7/18* (2013.01); *C09J 7/383* (2018.01); *C09J 7/385* (2018.01); *B29C 65/4825* (2013.01)

(58) Field of Classification Search
CPC ... B29C 39/265; B29C 65/4825; B29C 65/76; B29C 65/7802; B29C 65/7817; B29C 65/7805; B29C 66/98; B32B 38/14; B32B 38/145; G09F 7/18; G09F 19/22; C09J 7/385; C09J 7/383
USPC .................................................. 156/71, 277
See application file for complete search history.

(56) References Cited

U.S. PATENT DOCUMENTS

| | | | | | |
|---|---|---|---|---|---|
| 1,196,332 | A | * | 8/1916 | Cabell ....................... | G09F 1/10 40/124.4 |
| 3,444,732 | A | * | 5/1969 | McKinley ........... | B29C 66/9221 73/150 A |
| 5,077,921 | A | * | 1/1992 | Mooney ................... | A47G 1/06 248/470 |
| 5,305,537 | A | * | 4/1994 | Pascarelli ................. | G09F 1/10 40/661 |
| 6,266,069 | B1 | * | 7/2001 | Thagard .................... | G09F 9/33 345/638 |
| 6,417,904 | B1 | * | 7/2002 | Yamaoka ............. | G02B 5/3016 349/117 |
| 7,222,449 | B1 | * | 5/2007 | Gourand ................... | G09F 3/20 40/124.2 |
| 7,746,381 | B1 | * | 6/2010 | Ye .......................... | G06F 3/1446 348/207.99 |
| 8,852,374 | B2 | * | 10/2014 | Goto ........................ | G02B 5/30 156/229 |
| 10,558,847 | B2 | * | 2/2020 | Moussaffi .......... | G06K 9/00228 |
| 10,621,475 | B2 | * | 4/2020 | Moussaffi ............ | G06K 9/6262 |
| 10,726,600 | B2 | * | 7/2020 | Chan .................. | H04N 1/00132 |

(Continued)

*Primary Examiner* — Jonathan Liu
*Assistant Examiner* — Devin K Barnett
(74) *Attorney, Agent, or Firm* — Merchant & Gould P.C.

(57) ABSTRACT

A repositionable display panel includes a rigid image plate that includes a front surface configured to receive a colorant to form an image thereon and a back surface opposite to the first surface. The rigid image plate is defined by an image plate thickness and image plate widths. A spacer block is defined by a spacer block thickness and spacer block widths smaller than the image plate widths. A pressure-sensitive adhesive layer between the back surface of the rigid image plate and the spacer block bonds the rigid image plate and the spacer block together.

15 Claims, 6 Drawing Sheets

(56) References Cited

U.S. PATENT DOCUMENTS

| | | | |
|---|---|---|---|
| 10,762,126 B2* | 9/2020 | Moussaffi | G06T 7/0002 |
| 10,762,518 B2* | 9/2020 | Shan | G06Q 30/0201 |
| 10,803,298 B2* | 10/2020 | Moussaffi | G06K 9/6256 |
| 10,914,868 B2* | 2/2021 | Takada | B32B 3/266 |
| 2002/0054262 A1* | 5/2002 | Kitagawa | G02F 1/13363 |
| | | | 349/122 |
| 2002/0069566 A1* | 6/2002 | Netter | G09F 19/22 |
| | | | 40/605 |
| 2002/0078612 A1* | 6/2002 | Meacham | G09F 7/04 |
| | | | 40/711 |
| 2003/0056411 A1* | 3/2003 | Wijtenburg | G09F 27/00 |
| | | | 40/446 |
| 2003/0072078 A1* | 4/2003 | Higashio | B29D 11/00 |
| | | | 359/485.01 |
| 2003/0151813 A1* | 8/2003 | Nishida | G02B 5/3025 |
| | | | 359/487.01 |
| 2005/0181148 A1* | 8/2005 | Kim | C09J 133/04 |
| | | | 428/1.55 |
| 2006/0033993 A1* | 2/2006 | Sugino | C09J 7/22 |
| | | | 359/487.02 |
| 2008/0305281 A1* | 12/2008 | Li | H01B 1/24 |
| | | | 428/1.5 |
| 2009/0122401 A1* | 5/2009 | Shinagawa | B32B 7/12 |
| | | | 359/485.01 |
| 2009/0126247 A1* | 5/2009 | Thibault | B42F 5/00 |
| | | | 40/777 |
| 2009/0229151 A1* | 9/2009 | Brown, Jr. | G09F 15/0037 |
| | | | 40/475 |
| 2009/0231233 A1* | 9/2009 | Liberatore | G06F 1/1628 |
| | | | 345/1.3 |
| 2009/0256780 A1* | 10/2009 | Small | H04N 1/00458 |
| | | | 345/55 |
| 2010/0039590 A1* | 2/2010 | Miyatake | C09J 133/02 |
| | | | 349/96 |
| 2010/0186610 A1* | 7/2010 | Polk | B41J 3/4073 |
| | | | 101/35 |
| 2016/0152018 A1* | 6/2016 | Kim | B23K 26/359 |
| | | | 156/250 |
| 2016/0190510 A1* | 6/2016 | Li | H01L 25/165 |
| | | | 257/40 |
| 2018/0072531 A1* | 3/2018 | Liang | B65H 35/0033 |
| 2020/0141910 A1* | 5/2020 | Kessler | G01N 29/2437 |
| 2020/0331101 A1* | 10/2020 | Hall | B23K 26/362 |
| 2021/0009860 A1* | 1/2021 | He | C09J 9/00 |

* cited by examiner

REPOSITIONABLE DISPLAY PANEL

BACKGROUND OF THE INVENTION

The present application relates generally to technologies for producing customized image product, and in particular, to a personalized display panel that can be flexibly attached to a surface without altering the surface.

In recent years, the popularization of digital media and digital printing technologies has created great demands for consumer products decorated with customized images. An important category of such products are photo décor products that are used for decorating homes, offices, and public surroundings. Recently, there has been a surge in the demand for personalized photo décor products in response to temporary and short-term housing as well as the increased interest in more frequent changes in decorations at home.

A drawback for most conventional photo display products is that they require nails and fasteners to secure them on wall surfaces. There is a need for personalized photo display products that can be decorate a wall without damaging it. There is also a need for photo décor products that are portable and easily placed on walls.

SUMMARY OF THE INVENTION

In a general aspect, the present invention relates to a repositionable display panel that includes a rigid image plate having a front surface that can receive a colorant to form an image thereon; and a back surface opposite to the first surface, wherein the rigid image plate is defined by an image plate thickness and image plate widths; a spacer block defined by a spacer block thickness and spacer block widths; and a pressure-sensitive adhesive layer between the back surface of the rigid image plate and the spacer block, wherein the pressure sensitive layer can bond the rigid image plate and the spacer block, wherein the spacer block widths are smaller than the image plate widths.

Implementations of the system may include one or more of the following. When bonded together, an edge of the rigid image plate to an edge of spacer block can be in the range of 1.5 to 5 times a thickness of the spacer block. The rigid image plate can be made of a metal, wood, plastics, a composite material, a glass, or ceramics. The rigid image plate can include a colorant absorption layer on the front surface, wherein the image is formed by a colorant in the colorant absorption layer. The spacer block can be made of a foam material. The pressure-sensitive adhesive layer can include an acrylic material or a rubber-based material. The repositionable display panel can further include a double-sided adhesive tape comprising a first surface configured to be attached to a surface of the spacer block on an opposite side to the rigid image plate, wherein the double-sided adhesive tape includes a second surface configured to be attached to a wall surface. The pressure-sensitive adhesive layer can have a stronger bonding power than the double-sided adhesive tape. The colorant can be transferred to the front surface of the rigid image plate using thermal dye transfer or thermal sublimation to form the image on the front surface of the rigid image plate.

In another general aspect, the present invention relates to a method of manufacturing a repositionable display panel that includes forming an image on a front surface of a rigid image plate; placing the rigid image plate with a back surface upward in an alignment fixture; receiving a spacer block having a surface attached with a pressure-sensitive adhesive layer; removing a release liner from the pressure-sensitive adhesive layer attached to the spacer block; placing the spacer block in the alignment fixture with the pressure-sensitive adhesive layer facing down; attaching the pressure-sensitive adhesive layer on the spacer block to the back surface of the rigid image plate in in the alignment fixture; loading an assembly of the rigid image plate and the spacer block into an arbor press; and applying pressure on the spacer block against the rigid image plate to activate a pressure-sensitive adhesive in the pressure-sensitive adhesive layer to bond the spacer block to the rigid image plate to form a repositionable display panel.

Implementations of the system may include one or more of the following. The method can further include printing one or more alignment markers on an alignment sheet associated with the rigid image plate printed with the image; attaching the alignment sheet on the back surface of the rigid image plate; and aligning the spacer block relative to the rigid image plate in the alignment fixture using the one or more alignment markers before step of attaching. The step of aligning the spacer block relative to the rigid image plate can include aligning of the spacer block relative to the rigid image plate in the alignment fixture using the one or more alignment markers. The method can further include printing product tracking information on the alignment sheet. The method can further include attaching a double-sided adhesive tape on the spacer block of the repositionable display panel, wherein the repositionable display panel is attached to a wall surface by the double-sided adhesive tape. The pressure-sensitive adhesive layer has a stronger bonding power than the double-sided adhesive tape, wherein the method can further include removing the repositionable display panel from the wall surface by detaching the double-sided adhesive tape from the wall surface without breaking the pressure-sensitive adhesive layer.

The disclosed system and method can include one or more of the following advantages. The disclosed photo display product and the associated manufacturing method can provide personalized wall decorations without drilling nails and damaging wall surfaces. The disclosed photo display product is portable and can be conveniently positioned on and removed off walls, which make them convenient for temporary or short-term living. The disclosed photo display product also allows more frequent changes of display content on a wall and allows for different combination of personalized photos on a wall surface. The disclosed photo display product also does not require inserting prints into a frame as in some conventional display products.

These and other aspects, their implementations and other features are described in detail in the drawings, the description and the claims.

DETAILED DESCRIPTION OF THE INVENTION

Reference will now be made in detail to specific embodiments or features, examples of which are illustrated in the accompanying drawings. Generally, corresponding reference numbers will be used throughout the drawings to refer to the same or corresponding parts. Also, wherever possible, the same reference numbers will be used throughout the drawings to refer to the same or the like parts.

Figure 1:
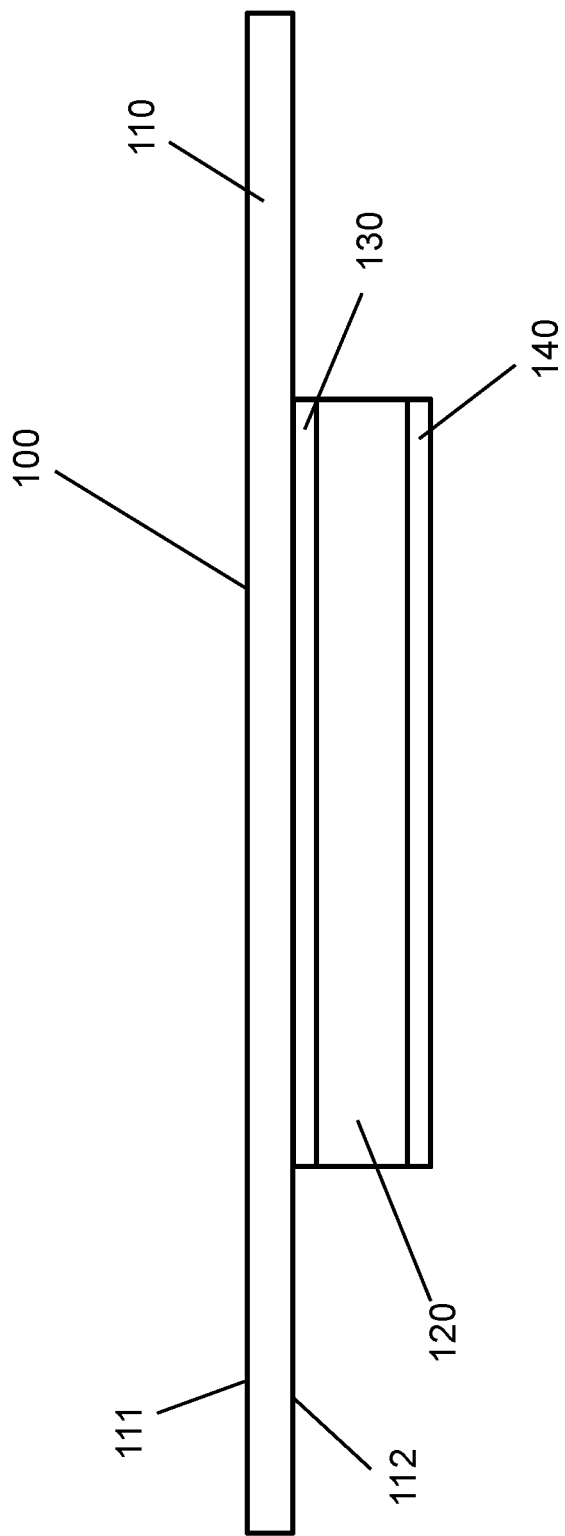
FIG. 1 is a cross-sectional view of a repositionable display panel in accordance with some embodiments of the present invention.

Referring to FIG. 1, a repositionable display panel 100 includes a rigid image plate 110 that includes a front surface 111 and a back surface 112 opposite to the first surface 111. The rigid image plate 110 is defined by an image plate thickness and image plate widths. The front surface 111 is adapted to receive a colorant to form an image thereon. The rigid image plate 110 includes a colorant absorption layer on the front surface 111. The image is formed by a colorant such as a dye or an ink in the colorant absorption layer. In some embodiments, the image is formed on the rigid image plate 110 using thermal dye transfer or thermal dye sublimation. In some embodiments, a colorant can be directly printed onto the front surface 111 of the rigid image plate 110.

The rigid image plate 110 can be made of a metal, wood, plastics, a composite material, a glass, or ceramics. The rigid image plate 110 can have width dimensions of 5'×7', 8'×8', 8'×10', 10'×14', etc., and is kept thin such as in a range of 0.030" to 0.045" and light weight so that it can be securely attached to a wall surface with a removeable double-sided adhesive tape.

The repositionable display panel 100 also includes a spacer block 120 adjacent to the back surface 112. The spacer block 120 is defined by a spacer block thickness and spacer block widths. The repositionable display panel 100 further includes a pressure-sensitive adhesive layer 130 between the back surface 112 of the rigid image plate 110 and the spacer block 120. The pressure-sensitive adhesive layer 130 bonds the rigid image plate 110 and the spacer block 120 together. The spacer block 120 is made of light and solid material such as a foam material. The pressure-sensitive adhesive layer 130 can be formed by an acrylic or a rubber-based material. In some embodiments, the spacer block 120 can also be glued to the rigid image plate 110.

Figure 2:
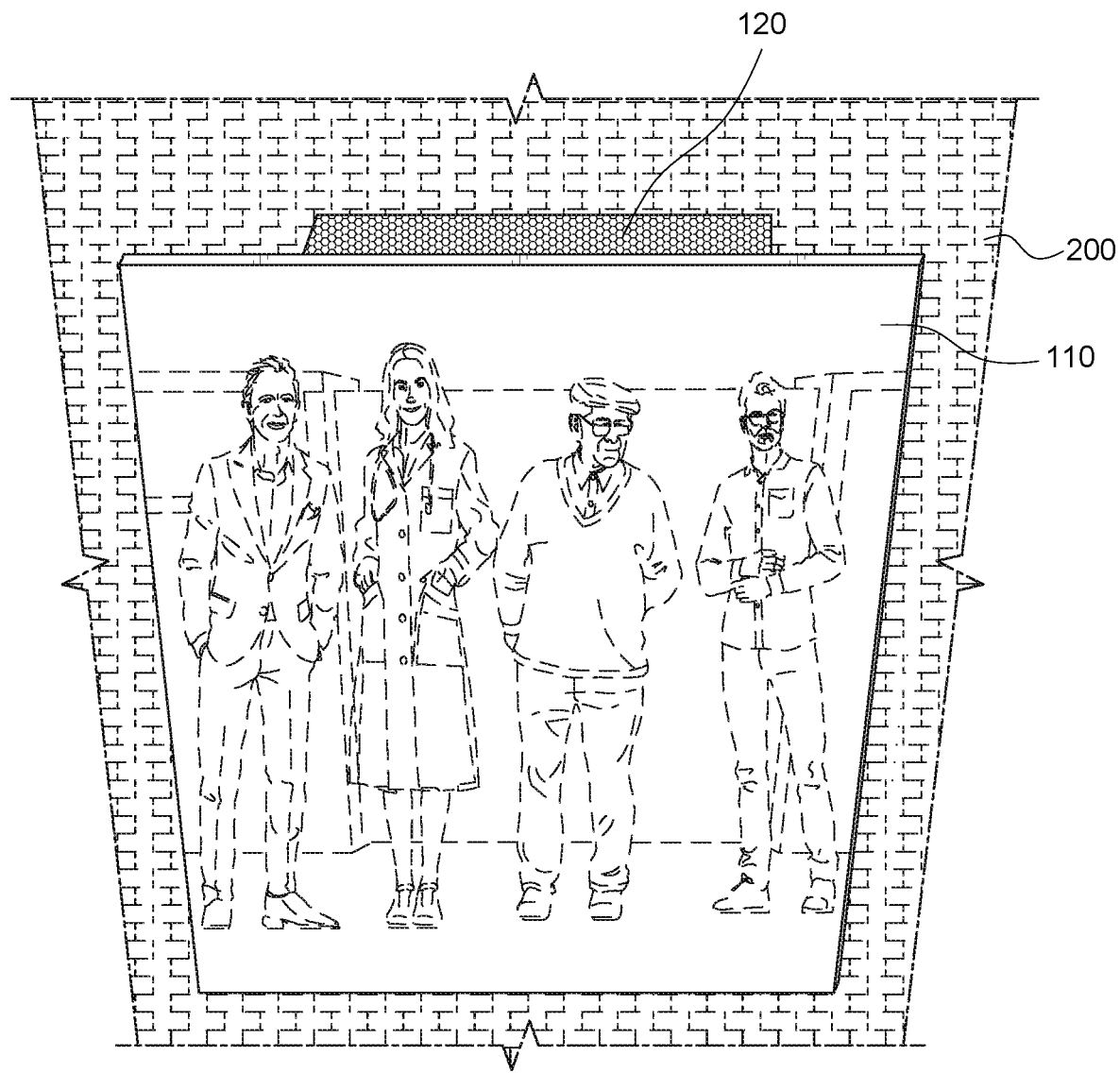
FIG. 2 is a front perspective view of the repositionable display panel spaced away from a surface.
Figure 3:
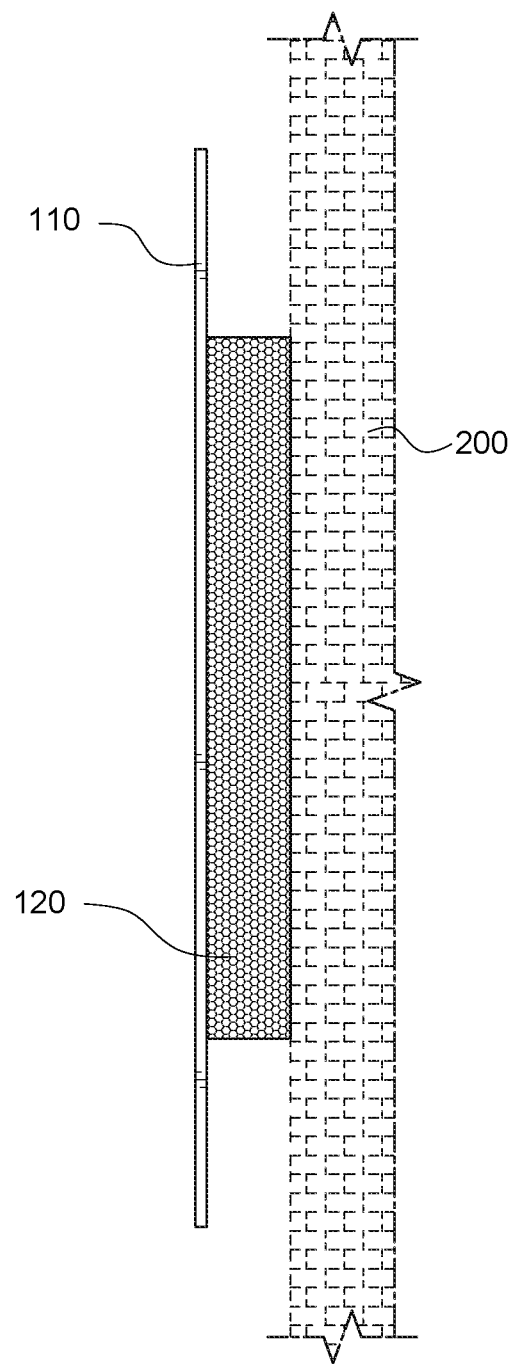
FIG. 3 is a side view of the repositionable display panel spaced away from a surface.

When the repositionable display panel 100 is attached to a wall for display and decoration, as shown in FIGS. 2-3, the spacer block 120 can give the appealing visual effect of "lifting" the rigid image plate 110 off from the surface of the wall. The spacer block widths of the spacer block 120 are substantially smaller than the image plate widths such that the spacer block 120 is hidden behind the rigid image plate 110 in most viewing angles to the repositionable display panel 100 attached to a wall 200. The overall product specification and performance can depend on the dimensions of the rigid image plate 110 and the spacer block 120. Specifically, the difference between the widths of the rigid image plate 110 and the widths of the spacer block 120 relative to the thickness of the spacer block are configured to provide the visual lifting effect as described above. The above dimensions are such that the edge of the rigid image plate to edge of spacer block is within a range of 1.5 to 5 times or 2 to 4 times of the thickness of the spacer block. For example, for a rigid image plate 110 of 8"×8" in widths, the spacer block 120 have widths of 5"×5" and ½" in thickness. The outer edge of the spacer block is thus inset from the back edge of the rigid image panel (110) approximately 1½", which provides a 'hidden' lift appearance of the spacer block when viewed from most angles.

The pressure sensitive adhesive must cover a specific surface area to provide enough strength so that a double-side adhesive tape 140 (described below) removes from the wall when the product is repositioned, the spacer block 120 does not detach from the rigid image plate 110. The spacer block size provides the rigid image plate support and a mechanical interface for the proper amount of double-sided tape surface area (proportional to the adhesive strength) relative to overall product weight, to properly adhere to a wall and provide long-lasting adhesion without falling off. The ratios of these components result in the balance and functionality of the product performance.

Figure 4:
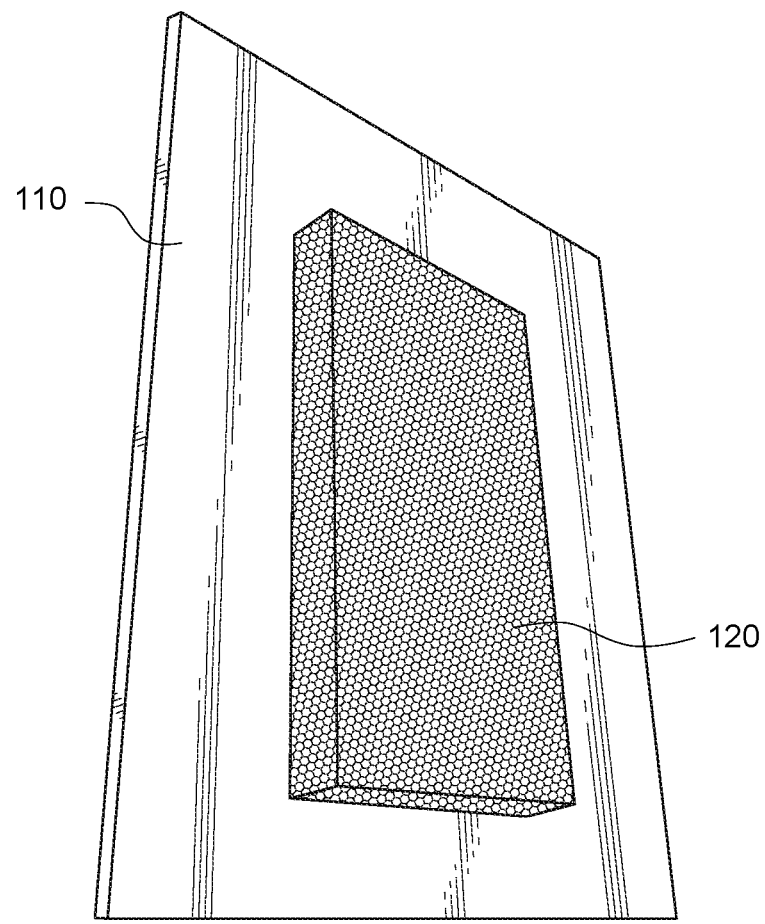
FIG. 4 is a rear perspective view of the repositionable display panel.
Figure 5:
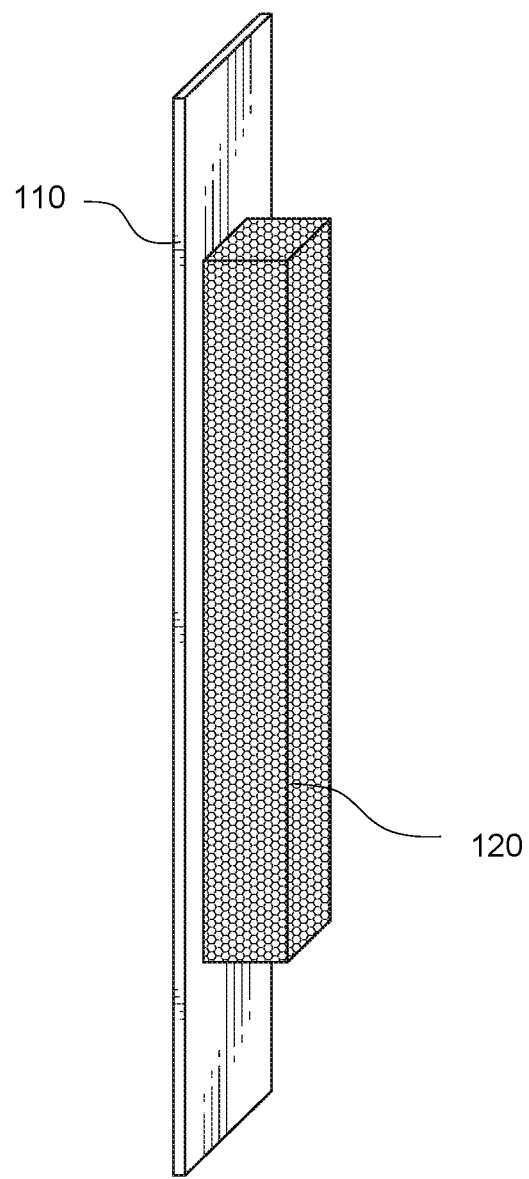
FIG. 5 is a side perspective view of the repositionable display panel.

The back side of the repositionable display panel 100 is shown in FIGS. 4-5. Other details of the repositionable display panel are disclosed in the commonly assigned pending U.S. patent application Ser. No. 29/746,210, titled "Repositionable Display Panel", filed on Aug. 12, 2020, the disclosure of which is incorporated herein.

When a user receives the repositionable display panel 100, he or she can remove a release liner from one side of a double-sided adhesive tape 140 to attach a first surface to the spacer block on an opposite side to the rigid image plate, and then remove a release liner from an opposite surface to attach the repositionable display panel 100 to a wall surface. The pressure-sensitive adhesive layer has a stronger bonding power than the double-sided adhesive tape 140 which allows the repositionable display panel 100 to be detached from the wall surface by detaching the double-sided adhesive tape 140 from the wall surface without breaking the pressure-sensitive adhesive layer. The double-sided adhesive tape 140 can have exemplified dimensions of 1"×4" and a peel strength of approximately 2 lb. per square inch, which can hold an exemplified weight of 0.26 lb. for the repositionable display panel.

Figure 6:
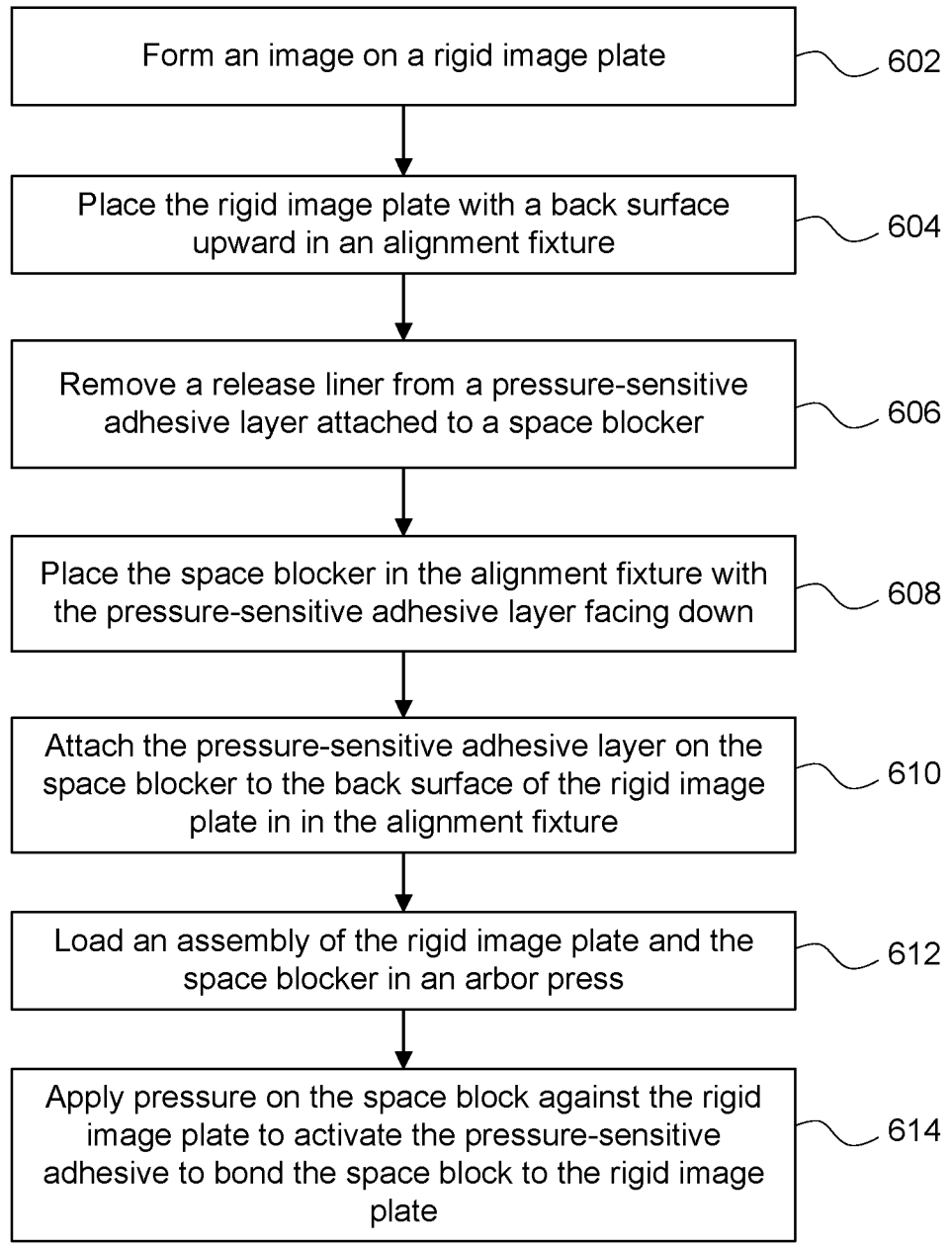
FIG. 6 illustrates a process for manufacturing the repositionable display panel in accordance with some embodiments of the present invention.

Referring to FIG. 6, a process of manufacturing a repositionable display panel is now described. An image is formed on a front surface of a rigid image plate (step 602). The rigid image plate can include a colorant absorption layer on the front surface. The image can be formed on the rigid image plate using thermal dye transfer or thermal dye sublimation. The image can also be direct printed to the rigid image panel. The rigid image plate is placed in an alignment fixture with a back surface upward (step 604). The printed image is facing downward. A spacer block having a surface attached with a pressure-sensitive adhesive layer is received. A release liner is removed from the pressure-sensitive adhesive layer attached to the spacer block (step 606) to expose the pressure-sensitive adhesive to the air. The spacer block is placed in the alignment fixture with the pressure-sensitive adhesive layer facing down (step 608). The pressure-sensitive adhesive layer on the spacer block is attached to the back surface of the rigid image plate in in the alignment fixture (step 610). Next, the assembly of the rigid image plate and the spacer block is loaded into an arbor press (step 612). Pressure is then applied on the spacer block against the rigid image plate to activate a pressure-sensitive adhesive in the pressure-sensitive adhesive layer, which bonds the spacer block to the rigid image plate to form a repositionable display panel (step 614).

In some embodiments, an interim alignment sheet can be attached to back surface of the rigid image plate, and moved together with the rigid image plate printed with the image. The alignment sheet is printed with product, which includes product tracking information for tracking the rigid image plate, the intermediate product assemblies, repositionable display panel and the repositionable display panel. The product information can include consolidation order, sub-batch ID, orientation, date, printer identification that printed or transferred the image, and a barcode or a 2D matrix code that embeds with such information. The alignment sheet can also be printed one or more alignment markers for aligning the spacer block to the rigid image plate. In the alignment fixture, before step of attaching, the spacer block is aligned relative to the rigid image plate using the one or more alignment markers on the back surface of the rigid image plate. The one or more alignment markers can also include orientation indicators for aligning of the spacer block relative to the rigid image plate in the alignment fixture.

In some embodiments, using the alignment markers to guide the orientation, an operator removes one release liner of a double-sided adhesive tape 140 (FIG. 1) and applies it to the upper portion of the spacer block on the back of a repositionable display panel. After a customer receives the repositionable display panel, the customer removes another release liner of the double-sided adhesive tape 140 on the back of the repositionable display panel, and attach it on to a wall 200 (FIGS. 2 and 3). The pressure-sensitive adhesive layer has a stronger bonding power than the double-sided adhesive tape 140, which allows the repositionable display panel to be removed from the wall surface by detaching the double-sided adhesive tape 140 from the wall surface without breaking the pressure-sensitive adhesive layer 140 between the spacer block and the rigid image plate.

What is claimed is:

1. A method of manufacturing a repositionable display panel, comprising:
    forming an image on a front surface of a rigid image plate;
    placing the rigid image plate with a back surface upward in an alignment fixture;
    receiving a spacer block having a surface attached with a pressure-sensitive adhesive layer;
    removing a release liner from the pressure-sensitive adhesive layer attached to the spacer block;
    placing the spacer block in the alignment fixture with the pressure-sensitive adhesive layer facing down;
    attaching the pressure-sensitive adhesive layer on the spacer block to the back surface of the rigid image plate in the alignment fixture;
    loading an assembly of the rigid image plate and the spacer block into an arbor press; and
    applying pressure on the spacer block against the rigid image plate to activate a pressure-sensitive adhesive in the pressure-sensitive adhesive layer to bond the spacer block to the rigid image plate to form a repositionable display panel.

2. The method of claim 1, further comprising:
    printing one or more alignment markers on an alignment sheet associated with the rigid image plate;
    attaching the alignment sheet on the back surface of the rigid image plate; and
    aligning the spacer block relative to the rigid image plate in the alignment fixture using the one or more alignment markers before attaching the pressure-sensitive adhesive layer on the spacer block to the back surface of the rigid image plate in the alignment fixture.

3. The method of claim 2, wherein aligning the spacer block relative to the rigid image plate includes:
    aligning of the spacer block relative to the rigid image plate in the alignment fixture using the one or more alignment markers.

4. The method of claim 2, further comprising:
    printing product tracking information on the alignment sheet.

5. The method of claim 1, further comprising:
    attaching a first surface of a double-sided adhesive tape to another surface of the spacer block opposite to the surface of the spacer block attached with the pressure-sensitive adhesive layer and bonded to the rigid image plate to form the repositionable display panel, wherein the repositionable display panel is attached to a wall surface by a second surface of the double-sided adhesive tape.

6. The method of claim 5, wherein the pressure-sensitive adhesive layer has a stronger bonding power than the double-sided adhesive tape, the method comprising:
    removing the repositionable display panel from the wall surface by detaching the double-sided adhesive tape from the wall surface without breaking the pressure-sensitive adhesive layer.

7. The method of claim 1, wherein the rigid image plate includes a colorant absorption layer on the front surface, and forming the image on the front surface of the rigid image plate comprises forming the image by a colorant in the colorant absorption layer using thermal dye transfer or thermal dye sublimation.

8. The method of claim 1, wherein the rigid image plate is made of a metal, wood, plastics, a composite material, a glass, or ceramics.

9. The method of claim 1, wherein the spacer block is made of a foam material.

10. The method of claim 1, wherein after the pressure is applied on the spacer block, an edge of the rigid image plate to an edge of spacer block is in a range of 1.5 to 5 times a thickness of the spacer block.

11. The method of claim 1, wherein the rigid image plate is defined by an image plate thickness and an image plate width, the spacer block is defined by a spacer block thickness and a spacer block width, and the spacer block width is smaller than the image plate width.

12. The method of claim 1, wherein the pressure-sensitive adhesive layer comprises an acrylic material or a rubber-based material.

13. The method of claim 1, wherein forming the image on the front surface of the rigid image plate includes directly printing a colorant onto the front surface of the rigid image plate.

14. The method of claim 5, wherein a surface area of the double-sided adhesive tape is proportional to an adhesive strength of the pressure-sensitive adhesive layer and is relative to a weight of the repositionable display panel.

15. The method of claim 5, further comprising:
    removing a first release liner from the first surface of the double-sided adhesive tape to attach the first surface of the double-sided adhesive tape to the another surface of the spacer block, wherein a second release liner is removable from the second surface of the double-sided adhesive tape to attach the repositionable display panel to the wall surface.

* * * * *